(12) United States Patent
Mazier (10) Patent No.: US 11,158,000 B2
(45) Date of Patent: Oct. 26, 2021

(54) METHOD AND CRYPTOGRAPHICALLY SECURE PEER-TO-PEER TRADING PLATFORM

(71) Applicant: Michael Mazier, New York, NY (US)

(72) Inventor: Michael Mazier, New York, NY (US)

( * ) Notice: Subject to any disclaimer, the term of this patent is extended or adjusted under 35 U.S.C. 154(b) by 822 days.

(21) Appl. No.: 15/366,917

(22) Filed: Dec. 1, 2016

(65) Prior Publication Data

US 2017/0161829 A1 Jun. 8, 2017

Related U.S. Application Data

(60) Provisional application No. 62/262,154, filed on Dec. 2, 2015.

(51) Int. Cl.
| | |
|---|---|
| *G06Q 40/04* | (2012.01) |
| *G06Q 20/22* | (2012.01) |
| *G06Q 40/06* | (2012.01) |
| *G06Q 20/38* | (2012.01) |
| *G10L 15/22* | (2006.01) |

(52) U.S. Cl.
CPC .......... *G06Q 40/04* (2013.01); *G06Q 20/223* (2013.01); *G06Q 20/382* (2013.01); *G06Q 40/06* (2013.01); *G06Q 2220/00* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 2005/0222936 A1* | 10/2005 | Panariti | G06Q 40/04 705/37 |
| 2007/0211651 A1* | 9/2007 | Ahmed | G06Q 30/0637 370/256 |
| 2009/0018968 A1* | 1/2009 | Ardell | G06Q 40/04 705/36 R |
| 2009/0177591 A1* | 7/2009 | Thorpe | G06Q 40/04 705/36 R |
| 2012/0069131 A1* | 3/2012 | Abelow | G06Q 10/067 348/14.01 |
| 2015/0206245 A1* | 7/2015 | Basu | G06Q 40/06 705/36 R |
| 2016/0092988 A1* | 3/2016 | Letourneau | G06Q 20/363 705/66 |

OTHER PUBLICATIONS

Ahila, et al., State of Art in Homomorphic Encryption Schemes, Int. Journal of Engineering Research and Applications, ISSN : 2248-9622, vol. 4, Issue 2( Version 6), Feb. 2014, pp. 37-43. (Year: 2014).*

(Continued)

*Primary Examiner* — Gregory S Cunningham, II
(74) *Attorney, Agent, or Firm* — Cozen O'Connor (57) ABSTRACT

A secure electronic peer-to-peer bond-trading network for executing trades at mid-market prices and a process for performing the trades in a secure cryptographic manner, where users can submit pricing or show trade orders in a manner such that confidence in the protection of confidential information is enhanced.

12 Claims, 6 Drawing Sheets

(56) References Cited

OTHER PUBLICATIONS

F. Förg, D. Mayer, S. Wetzel, S. Wuller and U. Meyer, "A secure two-party bartering protocol using privacy-preserving interval operations," 2014 Twelfth Annual International Conference on Privacy, Security and Trust, 2014, pp. 57-66, doi: 10.1109/PST.2014.6890924. (Year: 2014).*

J Benaloh et al., "One-way accumulators: a decentralized alternative to digital signatures", Advances in Cryptography, Eurocrypt '93 LCNS, vol. 765 Springer-Verlang, 1993, pp. 1-12.

J Camenisch et al., "An Efficient System for Non-transferable Anonymous Credentials with Optional Anonymity Revocation", IBM Research, Spring-Verlag Berlin Heidelberg 2001, pp. 1-30.

Kissner et al., "Privacy Preserving Set Operations" by, Carnegie Mellon University, $25^{th}$ Annual International Cryptology Conference, Aug. 2005, pp. 1-43.

\* cited by examiner

| Trade Blotter | | | | | | | | | |
|---|---|---|---|---|---|---|---|---|---|
| Account | Holdings(M) | BondID | Issuer | coupon | Maturity | next call date | Order Type | Order Amount(M) | Status |
| 100001 | 50 | 12345XYZ9 | XYZ | 5% | 6/15/36 | 6/15/26 | BUY GTC | 50 | ACTIVE |
| 100001 | 250 | 23456XYZ8 | ABC | 4% | 12/15/20 | 12/15/20 | BUY DAY ONLY | 10 | HOLD |
| 100002 | 25 | 34567ABC7 | XYZ | 5% | 6/15/46 | 6/15/26 | BUY LIMIT@101.50 | 5 | HOLD |

USER INPUT WINDOW: What bonds do you want to buy?(ex NY GOs 5 of 2020)

METHOD AND CRYPTOGRAPHICALLY SECURE PEER-TO-PEER TRADING PLATFORM

CROSS-REFERENCE TO RELATED APPLICATIONS

This application claims priority from U.S. Provisional Application Ser. No. 62/262,154 filed Dec. 2, 2015, the content of which is hereby incorporated by reference in its entirety.

BACKGROUND OF THE INVENTION

1. Field of the Invention

The present invention relates to peer-to-peer computing and, more particularly, to a method and cryptographically secure electronic peer-to-peer bond-trading network for executing trades at mid-market prices.

2. Description of the Related Art

Bond investors are bifurcated between small investors, who typically buy bonds in lot sizes of under $10,000, and large investors, who typically buy bonds in lot sizes of more than $100,000 to $1,000,000. Small investors usually face a bond broker or may have access to lists of bonds on websites that target retail investors. Bond prices available to small investors in small lot sizes are typically 1% to 3% higher than prices of comparable bonds in larger lot sizes, which is what large investors typically purchase. Current bond trading systems, developed in the past two decades, automate certain workflows of manual bond trading practices. A typical example is a Bloomberg Terminal, which has a "PICK" function, which is similar to electronic classified ads in a newspaper, listing thousands of municipal bonds available for sale. A bond buyer must scroll through the list, pick a bond to buy, then pick up the phone or use a short message service (SMS) (i.e., text) or chat messages to contact the bond dealer and take or negotiate a price.

On the other hand, other systems, such as www.tmc.com, provide users with an executable list of bonds that buyers can click on to commence trade execution. Here, however, no guarantee exists that the trade shall be available. Again, prices for small investors typically are around 1 to 3% higher than prices for comparable large lot bonds.

A recent development is the "all-to-all" bond trading systems, such as those introduced by Marketaxess.com, which connect large investors with other large investors. The "all-to-all" indicates that bond dealers, portfolio managers and other larger investors can "all" trade with each other instead of always using a bond dealer as the middleman. These developments may help large investors (e.g., the "big boys") to efficiently negotiate prices of large lot sizes with each other, but they do not help small investors, who lack knowledge of the latest and fairest market prices.

Another electronic "all-to-all" system, trumid.com, targets large institutional corporate bond trades and seeks to increase liquidity by narrowing the time windows during which certain corporate bonds are traded. These brief sessions, i.e., "swarms", have some similarities with traditional strategies of finding liquidity for "trade by appointment" stocks. Moreover, bid- and ask-prices are aggregated to compute a "mid-price" at which trades are executed. There are limitations associated with this approach. For example, there is a dearth of sufficient and timely pricing to produce a fair mid-price. Here, bond dealers, who are often best positioned to know timely bid- and ask-prices, have little vested economic interest in a system that helps others to trade away from them. Non-bond dealers, such as hedge fund managers, are not in business to constantly generate and update bid-and-ask prices. Moreover, individual systems must gain a "network effect", having enough participating users to more accurately reflect the entire market.

Another limitation is with respect to privacy and market impact. Here, users must trust that disclosure of their bid- and ask-prices will not adversely move prices away from them. Even if users or organizations trust each other, unauthorized access to their confidential data may work against their interests.

There are various problems associated with traditional bond trading. For example, i) small investors are at a disadvantage in negotiating prices, ii) bond dealers pass on to small investors incremental costs incurred in handling small lot size bonds, iii) the bond market is large and disparate, which makes it cumbersome to search for bonds, especially municipal bonds, iv) market impact of inquiries alone—some market participants are reluctant to disclose pricing or publically inquire about pricing on a particular illiquid bond amid concerns that by "showing their hand", counterparties all move their market prices against the favor of the original market participant, and v) computer security—distributed denial of service attacks, unauthorized leakage of sensitive pricing information are threats to modern computer systems.

SUMMARY OF THE INVENTION

Disclosed is a secure electronic peer-to-peer bond-trading network for executing trades at mid-market prices and a process for performing the trades in a secure cryptographic manner.

An enhanced user experience configuration provides capability for buyers and sellers to use a multi-modal interface, including speech recognition, to submit complex trading strategies or bond selection criteria, which are processed and converted to one or more potential orders. Next, a process matches and executes these orders, provided that all participants agree to transact at prices from a third-party ("Third Party Price") or prices derived from a calculation using real-time market data ("Derived Price") or prices based on privacy preserving computations on user-input prices using cryptographic techniques ("Cryptographic Derived Price"). The invention seeks to provide a remedy for small investors, who typically pay significantly higher costs to trade bonds with bond dealers as compared with costs incurred by institutional investors. Encryption of data permits public proof of operational correctness, while preserving participants' confidentiality and confidence; and mitigating opportunities for any party to exploit trading information.

Multi-modal interfaces on various electronic devices, such as mobile phones or desktop computers, provide the capability for: i) sellers to post specific bonds to sell, use rules to define bonds to sell, and use trade parameters, such a minimum price or an expiration time; ii) buyers to post specific bonds to buy, use rules to define bonds to buy, and use trade parameters, such as a minimum credit rating, or a maturity range. A complex trading strategy may include a dual buy and sell, such as sell a short-term bond and buy a long-term bond, provided that both trades must execute. All these rules and strategies are referred to here as Bond Selection Criteria. The interfaces have capability for buyers and sellers to use, but is not limited to, voice and speech recognition, text, keyboard/mouse, touch and localized haptics.

At discrete points in time, a matching algorithm processes all Bond Selection Criteria to generate potential orders and seeks to match buyer and seller orders. Participants are presented with very specific trades, which they can accept or reject. Trades may execute at the Third Party Price, Derived Price or Cryptographic Derived Price. The "Derived Prices" may be based on real-time market data, such as a yield margin with respect to a reference security. Cryptographic Derived Price may be based on privacy-preserving computations on user-input prices using cryptographic techniques; Third Party Prices are sourced from independent third party pricing services following practices used to value underlying securities held in mutual funds, exchange-trade funds or other investment companies regulated primarily under the Investment Company Act of 1940. Privacy preserving set intersection protocols using cryptographic methods permit buyers and sellers to disclose only a minimal amount of trade or pricing information, reducing market impact of their trading and limiting the amount of trust users must give up to counterparties or any other single centralized source. In accordance with invention, it is a desire to provide the capability to handle a range of fixed income products, including municipal, corporate, sovereign, agency, treasury bonds; and unit investment trusts, auction rate securities, certificates of deposit, mortgages, loans, and online marketplace loans.

With respect to the disadvantages suffered by small investors, the present invention uses third-party prices, following practices widely used by institutional investors. As a result, the bazaar-like feeling of buying when prices are not widely known is avoided and users are, instead, presented with the opportunity to accept or reject a transparent price.

With respect to the economic costs incurred by dealers, which are passed on to investors, the present invention bypasses the need for bond dealers to hold on to bond inventory by virtue of providing the inventive peer-to-peer trading.

As for the disadvantages associated with cumbersome searches for bonds, the present invention provides a user experience that simplifies searches and matches trades by allowing users to communicate their trading strategies in natural language and obtain specific trade proposals that meet those strategies.

As for the disadvantages associated with privacy concerns and market impact, the present invention provides cryptographic zero-knowledge proof protocols that disclose only the minimal amount of information required during each step of various processes such as reporting a price or making buy or sell inquiries about specific illiquid bonds.

The invention provides the capability to handle a range of fixed income products, including municipal, corporate, sovereign, agency, treasury bonds; and unit investment trusts, auction rate securities, certificates of deposit, syndicated loans, mortgages and online marketplace loans.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The various features, functions and advantages characterizing the invention will be better understood by reference to the detailed description which follows, taken in conjunction with the accompanying drawings, in which.

DETAILED DESCRIPTION OF THE EXEMPLARY EMBODIMENTS

Figure 1:
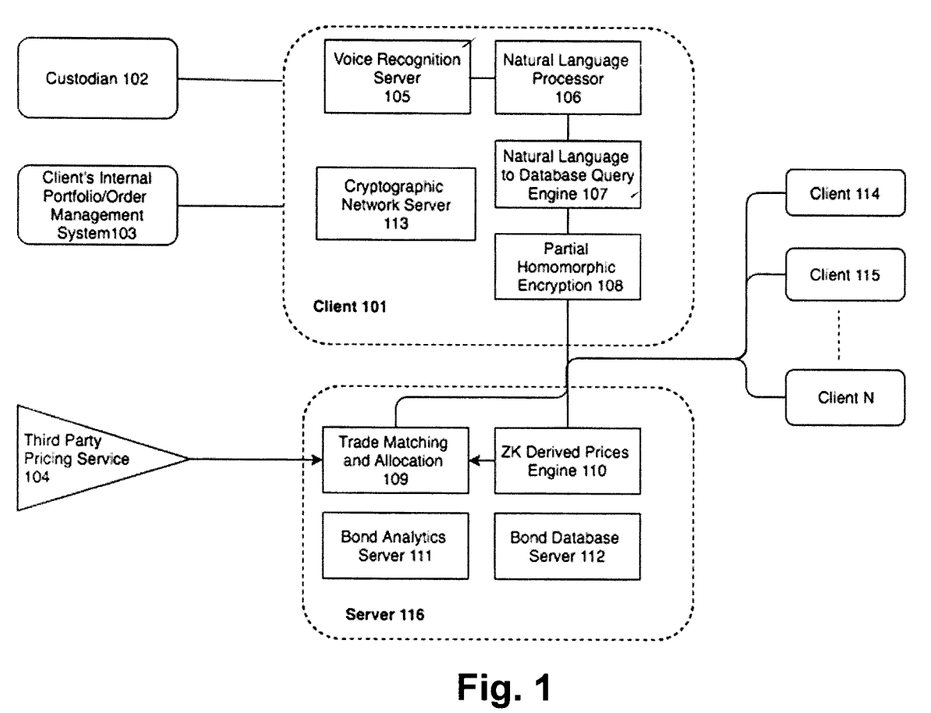
FIG. 1 is a schematic block diagram of a cryptographically secure electronic peer-to-peer bond-trading network for executing trades at mid-market prices in accordance with the invention.

FIG. 1 is a schematic block diagram of a distributed computer system, comprising a cryptographically secure electronic peer-to-peer bond-trading network for executing trades at mid-market prices in accordance with the invention. With specific reference to FIG. 1, Client 101 may be implemented on a desktop computer, a web browser, phone, tablet, or may be a composite web page embedded in the website of a third-party host. It should be understood the user interface and look-and-feel of Client 101 depends on the device in which it is implemented or embedded. Server 116 may be implemented as at least one standalone server, a cloud-based computing environment or may be run as at least one virtual machine on at least one physical server. It should be understood the Client 101 and Server 116 each include a processor and memory (such as secure cryptoprocessor hardware and memory). In certain embodiments, special purpose hardware devices are connected to general purpose computing hardware to perform cryptographic functions, such as cryptographic key generation, remote attestation and verification and random number generation.

Also shown is Custodian 102, Client's Internal Portfolio/Order Management System 103, and Third Party Pricing Service 104, which together help users to decide what bonds to buy or sell. A user may use human voice commands to indicate Bond Selection Criteria, which gets passed to Voice Recognition Server 105. Alternatively, the user many enter Bond Selection Criteria via keyboard entry into the Natural Language Processor 106. In either case, Natural Language to Database Query Engine 107 converts natural language text to computer-readable database query language commands, including variables such as a binary vector that marks a set of target bonds in a database via the use of 1's or 0's. Partial Homomorphic Encryption 108 handles a portion of cryptographic algorithms, such as the Privacy Preserving Set Intersection problem (see, e.g., Kissner et al. "Privacy Preserving Set Operations" by, Carnegie Mellon University, 25$^{th}$ Annual International Cryptology Conference, August 2005, the contents of which are incorporated by reference herein in its entirety), known to experts in the field, to encrypt a set of bonds, the encrypted data of which are subsequently used to match buyer and sellers. An alternative approach is to use commutative encryption, whereby the objective is for a buyer and a seller to learn of intersecting bonds in their respective set of bonds with zero knowledge of other bonds in their respective sets. These algorithms may be handled via Cryptographic Network Server 113, which forms part of a secure peer-to-peer network of servers that collectively implements, without trusted third-parties, cryptographic algorithms, such as Privacy Preserving Set Operations, known to the persons of ordinary skill in the field of cryptography.

In accordance with the invention, the Cryptographic Network Server 113 is always a separate computer process from Client 101 and may be run at remote locations, especially when Client 101 is instantiated on a device such as a smartphone. Nevertheless, Client 101 has a secure connection with Cryptographic Network Server 113. Moreover, neither Server 116 nor any other servers, have full knowledge of the entire marketplace of bonds available for purchase or sale. Hence, the Cryptographic Network Servers are only partially trusted, which induces users to submit pricing or show trade orders, while enhancing confidence in the protection of confidential information.

Zero Knowledge (ZK) Derived Prices Engine 110 computes a portion of Cryptographic Derived Prices by collecting prices based on zero knowledge price inputs from users that agree to submit prices. Some of these submissions are results from the Cryptographic Network Server of each client. Client 114, Client 115, . . . , Client N represent multiple client instantiations, where each instantiation replicates the functionality provided by Client 101. Clients are all connected to Server 116 or other servers (not shown) that replicate Server 116. Each client also has a respective Cryptographic Network Server 113. Trade Matching and Allocation 109 collects all results emanating from the respective Bond Selection Criteria and Cryptographic Network Server 113 of each user, and performs matching, some of which is based on partial knowledge. Bond Database Server 112 maintains terms and conditions about specific bonds. Bond Analytics Server 111 performs computations, such as yields and durations of specific bonds.

Figure 2:
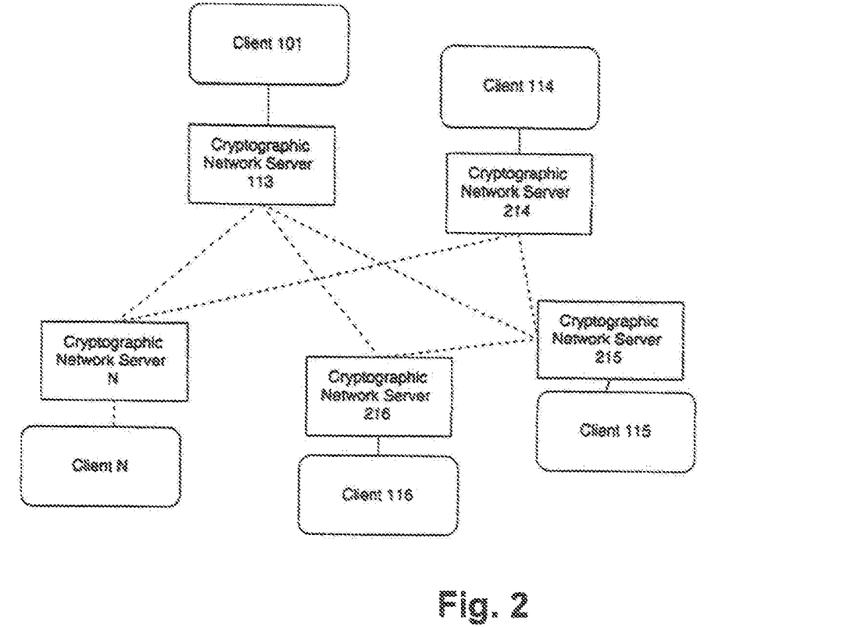
FIG. 2 is schematic block diagram of a cryptographic network servers for computing cryptographic algorithms without a central trusted party in accordance with the invention.

FIG. 2 shows a secure peer-to-peer network of cryptographic servers for making privacy-preserving cryptographic computations, such as known algorithms presented in "Privacy Preserving Set Operations" (see, e.g., Kissner et al.).

Client 101, Client 114, Client 115, Client N, and Cryptographic Network Server 113 in FIG. 2 carry over from and represent the same meaning in FIG. 1. In FIG. 2, however, Cryptographic Network Server 113 is shown outside the Client 101 to indicate Cryptographic Network Server 113 may be implemented away from Client 101, such as on a third-party cloud computer. Client 101 communicates via a secure encrypted line with Cryptographic Network Server 113. Cryptographic Network Server 113, 214, 215, 216, . . . , N form a network of cryptographic servers, each having secure connectivity to one respective client as illustrated.

Certain cryptographic protocols, with the requirement of no trusted third party, require multiple passes of partially encrypted data among a group of trustless parties. For example, Cryptographic Network Server 113 performs a partial cryptographic computation and passes the result to Cryptographic Network Server N, which performs an additional partial cryptographic computation and passes the result to Cryptographic Network Server 214, which performs an additional partial cryptographic computation and passes the result to Cryptographic Network Server 215. Cryptographic Network Server 215 then performs an additional partial cryptographic computation and passes that result to Cryptographic Network Server 216, which performs an additional partial cryptographic computation and passes this result to Cryptographic Network Server 113. Another ring of computations now occurs, which permits each Cryptographic Network Server 113, 214, 215, 216, . . . , N to derive a final answer.

The exact order in which data passes around the secure peer-to-peer network does not matter as long as a full circle is made. If a Cryptographic Network Server drops out in the middle of a ring of computations, the computations may continue or may need to be restarted, depending on the algorithm and portion of the algorithm already computed. Each party to the transaction performs a portion of the cryptographic protocol, passes the result to one or more other parties to the transaction, then receives a result in return for final processing and disclosure of secret information. The presently disclosed network allows for trustless computations without a trusted central party. The implementation may use a private blockchain distributed ledger to provide an immutable audit trail of all activity. An exemplary algorithm is provided in that one function is to "advertise" sale of bonds while controlling various levels of transparency in order to avoid adverse market impact. Sellers may be hesitant to show their full list of bonds they are seeking to sell and, conversely, buyers may be hesitant to show their full list of bonds they seek to buy. As such, in accordance with the invention, users are permitted to privately disclose their respective bond lists to counterparties via a zero knowledge proof membership function. A bond seller is thus shown whether a particular bond is on a buy list or, conversely, a bond buyer is shown whether a particular bond is on a for-sale list without exposing the full list.

Figure 3:
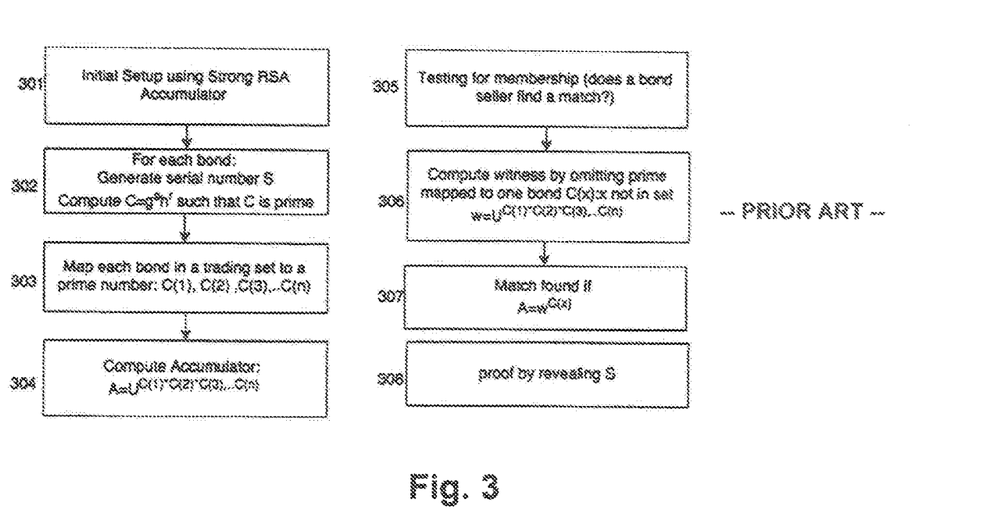
FIG. 3 is a flowchart of a method for generating zero-proof knowledge of a bond match via a conventional homomorphic encryption protocol in accordance with the prior art.

FIG. 3 is a flowchart of an exemplary method for generating zero knowledge proof of a bond match via a conventional homomorphic encryption protocol in accordance with the prior art. With specific reference to FIG. 3, shown therein is a single instance of a privacy preserving method that may be implemented via a network of Cryptographic Network Servers. The protocol shown is used in certain cryptocurrency protocols. Here, an initial setup is performed using a robust RSA accumulator, as indicated in step 301. The cryptographic method implemented here is based on the publication by J. Benaloh et al., "One-way accumulators: a decentralized alternative to digital signatures", Advances in Cryptography, Eurocrypt '93 LCNS, vol 765 Springer-Verlang, 1993, pp 1-12 and J. Camenisch et al., "An Efficient System for Non-transferable Anonymous Credentials with Optional Anonymity Revocation", IBM Research, Spring-Verlag Berlin Heidelberg 2001, the content of which are incorporated by reference herein in their entirety. In the presently contemplated example, a user commits to a trade, without revealing the commitment until a subsequent point in time, and may chose not to reveal their commitment if no matches were found via other market criteria.

Next, a random serial number S is generated for each bond, and for each bond $C=g^s h^r$ is also calculated such that C is prime, as indicated in step 302. In other words, for each bond in a database of bonds, a randomly generated serial number is mapped to a bond, where r is a large random number, and g and h are random generators. If C is not a prime number, then serial number S is selected randomly, and C is re-computed. This process is repeat until C is prime. This C is established as C(1).

After calculating C, each bond in a trading set is mapped to a prime number, as indicated in step 303. Here, the process of randomly generating serial numbers S is repeated for all bonds in the database subject to computing a C that is prime such that each bond, i.e., bond(1), bond(2), . . . , bond(n), maps to C(1), C(2), . . . , C(n), and S(1), S(2), . . . , S(n).

The accumulator is now computed via repeated exponentiation, as indicated in step 304. Here, the computation is performed in accordance with the relationship:

$$A = U^{C(1)*C(2)*C(3), \ldots, C(n)}.$$

A test is now performed to determine membership, i.e., does a bond seller find a match, as indicated in step 305. Next, the prime mapped to one bond C(x):x, which is not in the set, is omitted to compute the witness, as indicated in step 306. Here, the set is in accordance with the following relationship:

$$w = U^{C(1)*C(2)*C(3), \ldots, C(n)}.$$

It should be noted the computation of the witness w is performed in a manner similar to the computation for the Accumulator A, except here the value that one wishes to prove membership of is omitted, where each bond(i) has a w(i) and U is a value.

Next, a check is performed to determine whether a match is found, as indicated in step 307. That is, a match is found if the following relationship is met:

$$A = w^{C(x)}.$$

Put differently, a bond(i) is found on the list if w(i) raised to the power of C(i) equals A. Next, the party that placed bond(i) on the list proves that they placed the bond on the list by revealing S(i), which can be proven by computing C(i), as indicated in step 308.

Other uses of this method may be that instead of mapping S to bonds, S can instead be mapped to encrypted data on a private blockchain. It is now possible for a party to the transaction to reveal that they placed data on the blockchain. The data can be other trade parameters or details pertaining to, such as a "pairs trade" in which one transaction is contingent upon execution of another transaction.

The method and secure peer-to-peer network in accordance with the invention provides a remedy for small investors who typically pay significantly higher costs to trade municipal, corporate or sovereign bonds in lot sizes of under $100,000 as compared with costs incurred by institutional investors who typically trade in lot sizes of at least $1,000,000. The financial press and U.S. regulators have raised concerns about trading costs for small investors, in particular for small municipal bond investors. According to various studies and reports, bid-ask spreads on municipal bonds for small investor lot sizes can average between 1% and 2.5% of market price, whereas bid-ask spreads for institutional investor lot sizes average about ¼% to ½% of market price. A few examples of articles/reports include:

"Regulators Want Data on Bond-Trade Fees; SEC, Others scrutinize fees paid by Retail Bond Investors"(Wall Street Journal, Jan. 13, 2015)

"Muni Costs hit investors in the Wallet" (Wall Street Journal Mar. 10, 2014)

"Muni bond investors can pay big markups" (USA Today, Jun. 17, 2013)

"Statement on Making the Municipal Securities Market More Transparent, Liquid and Fair" on Feb. 13, 2015, Commissioner Luis Aguilar, U.S. Securities and Exchange Commission, (www.sec.gov website, accessed Oct. 12, 2015).

"Report on Secondary Market Trading in the Municipal Market (July 2014)", Municipal Securities Rulemaking Board (www.msrb.org website, accessed Oct. 12, 2015)

Background on Traditional Bond Buying

Bond dealers add value by providing liquidity to investors and seek to profit by standing ready to buy bonds at one price ("Bid Price"), and sell bonds at a slightly higher price ("Ask Price"). Competitive forces among bond dealers and regulatory requirements help to maintain the difference between Bid Price and Ask Price ("Bid-Ask Spread") at a reasonable level. Bond dealers often borrow money to finance their bond holdings ("Inventory"), which incurs a cost ("Carrying Cost"). Bond dealers take the risk that, having purchased a bond, they may not be able to sell the same bond in a timely manner ("Liquidity Risk"), or that the market price of a bond they hold may drop unexpectedly during the interim ("Market Risk"). Typically, as Liquidity Risk rises, so does Bid-Ask Spread, which increases overall transaction costs to an end investor. In order to mitigate Liquidity Risk, dealers may seek to trade only when they find a matching pair of buyer and seller—a riskless principal trade. These trades require the buyer and seller to be present in the market at or nearly the same time, a difficult criterion to meet at times. The asymmetrical nature of information flow between bond dealer and small investor gives bond dealers a stronger negotiating positive vis-á-vis the setting of Bid-Ask Spreads, which increases costs to the small investor.

In order to mitigate Market Risk, bond dealers may seek to "hedge their inventory"—invest in a related position that offsets gains/losses in the bonds they presently hold. Unfortunately, municipal bonds are notoriously difficult to hedge, in part because of the tax treatment of tax-exempt bonds (the vast majority of municipal bonds are tax-exempt). In a typical hedging strategy that involving a repurchase agreement, i.e., sell a bond with the agreement by the seller to repurchase at a later date, the tax-free characterization of "tax-free" coupon income cannot be passed-through back to the original bond owner. These tax complications contribute to the added challenge of trading municipal bonds. The aforementioned challenges are inherent to the way traditional bond dealing works, and add a cost component to the overall transaction costs incurred ultimately by buyers and sellers.

Buyers and sellers of small lot size bonds include individual investors and registered financial advisors who trade on behalf of their clients. Institutional investors, who typically trade large lot sizes, also trade smaller lots at times. Market participants have a wide range of needs and market expertise. The traditional way to buy a municipal bond has been to pick up the phone and call and negotiate with several bond dealers, who may publish bids and offers, which may be subject to negotiation. Electronic trading systems automate traditional processes by showing bids/asks online. Regardless, small investors typically have a limited ability to negotiate on price. Moreover, users must search through hundreds or thousands of bonds and decide the right bond to buy or sell. Whether on the phone or via an electronic trading system, the problem still remains that the small investor pays a wider bid ask spread than do larger investors.

Faster or more efficient electronic trading systems do not address the economic costs incurred by bonds dealers in holding small lot size bonds.

Using Artificial Intelligence Techniques to Connect Buyers and Sellers, and Cutting Out the Middleman The method and secure peer-to-peer network in accordance with the invention uses artificial intelligence tools to help participants define the bonds they wish to buy or sell. These new processes replace the need for participants to chat with many salespeople about what they are looking for, or to sort through many lists of bonds on various electronic systems. Instead, among other interface modes, participants may use speech or text to communicate what they want and are then presented with exact trades that meet those wants. Moreover, buyers and sellers can have confidence that their trades are executed at a fair mid-market price, where a trusted third-party is estimating mid-market prices based on institutional lot-size trades in the marketplace.

Moreover, small investors achieve pricing based on established practices similar to those outlined in "An Introduction to Fair Valuation" (Spring 2005) by Investment Company Institute (www.ici.org), a leading global association of regulated funds, including mutual funds, exchange-traded funds (ETFs), closed-end funds, and unit investment trusts (UITs) in the United States and similar funds offered to investors in jurisdictions worldwide.

The method and secure peer-to-peer network in accordance with the invention seeks to provide investors who buy a single bond with the same economics as if they were buying a regulated investment company (RIC) fund holding a single bond, notwithstanding the fact that RICs are precluded from holding a single bond. The point here is however, that such a single bond would be priced by third-party pricing services as part of the process to rollup and compute a fund's net asset value.

The method and secure peer-to-peer network in accordance with the invention seeks to avoid bond dealers' inherent cost structure by providing the capability for buyers and sellers to transact directly with each other (i.e., peer-to-peer). Because many investors wish to remain anonymous, the invention allows for a clearing broker to stand in between the peers, i.e., strictly as a service at minimal costs and full transparency. Bond dealers or other large investors, such as a mutual fund manager, can also act as a buyer or seller. The term "all-to-all" is sometimes used if bond dealers or other large entities are included among the "peers." The invention has capability for large orders to be aggregated with multiple smaller orders, depending on trade parameters. For example a buyer of a certain $100,000 par lot bond may be matched with 4 sellers, each selling $25,000 par lot bonds. Trade parameters would control the extent to which partial fills or number of counterparties may be used.

The Innovation of Using Third-Party Prices for Small Investors

Traditional bond trading processes, computer-based or otherwise, typically seek to post bid and ask prices, or perform a bidding or auction process. These processes are undoubtedly essential for efficient markets. An important function of bond dealers is price discovery, which informs market participants of the current best Bid and Ask Prices of institutional lot sizes. Bond market professionals, including independent third party pricing services, tend to place little weight, if any at all, on the informational value of small lot size pricing. Price discovery typically depends on execution prices of larger transactions not small trades. Recognizing that small investors are not expected to have expertise in negotiating prices or valuing bonds, the invention avoids an auction process altogether and seeks to execute trades at prices that are near the midpoint between Bid Price and Ask Price (Mid Price), benefiting both the Buyer and Seller. This innovative method essentially piggybacks off the price discovery that occurs when large-lot bonds trade and their execution prices are reported publically, as required by regulators (see www.msrb.org). Mid Prices are lower than Ask Prices (benefiting the Buyer) and higher than the Bid Prices (benefiting the Seller).

The risk that a third-party price may be erroneous is a well-known problem to the skilled person. Procedures for challenging and correcting prices are part of the processes that come with third-party pricing services. This is part of standard operating procedures at mutual fund companies who use third party pricing to value the net asset values of mutual funds.

Counterparty Risk

After a trade is completed, one party to the bilateral trade may fail to deliver bonds or cash ("Counterparty Risk"). There are several ways to handle this issue:

1. Anonymous trading with a clearing broker to serve as an intermediary on all trades and guarantee delivery of cash and/or securities to both parties. The clearing broker is the facing counterparty to all trades.
2. Anonymous trading with a clearing broker, but the clearing broker passes along counterparty risk. In this case, as part of the process of onboarding new users, each user shall be assigned a counter-party credit score, based on each organizations' latest financial statements and, if application and the applicant is a FINRA member, a FOCUS report. Although counterparties remain anonymous, metrics about their credit worthiness is fully disclosed. Users of the Invention would then use a trade parameter to set the minimum credit worthiness of the counterparty they are willing to trade with.
3. Peers settle directly with each other. In this case users know whom they are trading with and can assess their own counter-party risk. During pre-trade setup, users indicate specific counterparties they are willing to trade with.
4. Securities held by mutually trusted tri-party or custodian. Before trading, Sellers must deliver their securities to a tri-party or custodian (or use such a trusted custodian), who in turn guarantees delivery of securities to the Buyer. Buyer's counterparty risk is now with the tri-party or custodian not the Seller. This option is an effective solution for risky Sellers who are deemed by others to have high counterparty risk.

Frictionless User Experience

The invention seeks to provide a frictionless user experience by integrating voice recognition and natural language software to generated database queries to a reference database as part of the process in which Sellers post bonds or Buyers post bonds or generate their Bond Selection Criteria.

As an example, a buyer may enter their Bond Selection Criteria, such as:

"Buy 100 MTA 5% bonds maturing between 10 to 15 years"

"Buy 50 NY GOs 5% of 2020"

A seller must specify specific bonds to sell:

"Sell 100 of 123456AB"

Bond sellers typically have very specific bonds to sell. Application Programming Interface (API) connections to their local custodian or portfolio management system adds a validation check to warn users if they attempt to sell a bond they don't own.

Sellers may also build baskets and sell one from the basket:

"Sell one of the following: 100 of 123456AB or 100 of 123456XY"

A trading strategy may include a "maturity extension trade":

"Sell 100 MTA 5% of 2020 and buy MTA 5% maturing between 2030 and 2045"

Users are provided with instant feedback showing either a complete list of bonds in their Bond Selection Criteria (if the number of bonds is reasonable) or a reworded user-friendly, precise description of the bonds the users has selected. This feedback information can be used to narrow down or help the user to refine their Bond Selection Criteria. The user can use Bond Selection Criteria to browse the bond reference database 112 of the peer-to-peer platform.

The plain English language entries provided by the user are processed to produce an intermediate set of technical parameters as input to an order matching algorithm. Ultimately, Bond Selection Criteria reduces to a search for a subset of the bond universe. The secure peer-to-peer platform in accordance with the invention may run queries in a time/priority order. Having found matches, the secure peer-to-peer platform proposes trades. In some cases, the trades will execute at the Third Party Price (if user selected this mode) or initiate another round of confirmations to buyer and or seller as a final step.

Optimization

The order matching algorithm considers various factors, such as individual trade parameters, the length of time an order has remained open, the length of time an order is committed to remain open; while having a bias to maximizing aggregate trade volume subject to various business, and regulatory guidelines. Various optimization strategies are possible, such as time priority, maximizing volume or other modes.

TABLE 1

Representation of Buy/Sell order mask

| | Seller A | Seller B | Seller C | Buyer D | Buyer E | Buyer F |
|---|---|---|---|---|---|---|
| Bond # 1 | 0 | 0 | 0 | 0 | 0 | 1 |
| Bond # 2 | 0 | 0 | 0 | 0 | 0 | 1 |
| Bond # 3 | 0 | 0 | 0 | 0 | 0 | 1 |
| Bond # 4 | 0 | 0 | 0 | 0 | 0 | 1 |
| Bond # 5 | 0 | 0 | 0 | 0 | 0 | 1 |
| Bond # 6 | 0 | 1 | 1 | 0 | 1 | 1 |
| Bond # 7 | 0 | 0 | 0 | 0 | 1 | 0 |
| Bond # 8 | 1 | 0 | 0 | 1 | 1 | 0 |
| Bond # 9 | 0 | 0 | 0 | 0 | 1 | 0 |
| Bond # 10 | 0 | 0 | 0 | 0 | 1 | 0 |

As a general simplified illustration of the order matching algorithm, Table 1 shows a representation of possible bond orders in a small example that assumes a total of 10 bonds in the entire universe. The binary matrix indicates that Seller A is seeking to sell bond #8. Seller B and Seller C are both seeking to sell bond #6. Buyer D seeks to buy bond #8. However, Buyers E and Buyer F have each entered Bond Selection Criteria, possibly in plain English. All Bond Selection Criteria are pre-processed to produce a representation of the subset of the universe of bonds that buyers are willing to buy. Buyer E is willing to buy any of bonds 6, 7, 8, 9, or 10. Buyer F is willing to buy any of bonds 1, 2, 3, 4, 5, or 6. The possible permutations that allow a match are:

From the sellers' point of view:
Seller A can match with Buyer D or E.
Seller B can match with Buyer E or F.
Seller C can match with Buyer E or F.

From the buyers' point of view:
Buyer D can match with Seller A.
Buyer E can match with Seller A, B or C.
Buyer F can match with Seller B or C.

In the presently contemplated example, if the goal is to maximize trade volume, while ignoring everything else, then Buyer D must be matched with Seller A. The remaining matches can be performed as either i) Seller B matches with Buyer E, and Seller C matches with Buyer F, or ii) Seller B matches with Buyer F, and Seller C matches with Buyer E.

A timestamp may serve as a tiebreaker, where earlier orders get priority. A real world problem with many thousands of trades would use Mixed Integer Programming optimization software. A strictly time-priority driven algorithm would seek to match the earliest seller against all other buyers and so on until all attempts are exhausted. It should be noted that a strictly time-priority algorithm does not necessarily maximize trade volume but is simpler to explain to the marketplace. In preferred embodiments, a combination of time-priority and volume maximization is the practical solution that is used. All trades are grouped by time buckets (e.g., 9:00 am to 9:59 am, or 10 am to 10:59 am). The optimization algorithm then attempts to maximize volume within each time bucket, but the earlier buyers are matched versus all subsequent sellers; and earlier sellers are matched versus all subsequent buyers. In preferred embodiments, the time parameters are driven by regulatory and user guidance.

Third Party Pricing Sources

The method and secure peer-to-peer network in accordance with the invention has multiple modes of operation in the way it obtains third party prices:

1. Procured from independent third-party pricing services for a fee; and follow practices and processes similar to the way regulated investment companies value their underlying securities to compute the net asset values of their funds in a conventional known manner.
2. Use real-time bid/ask price sources to compute mid-prices.
3. Internal and independent process estimates mid-prices using market data. A separate part of the organization would generate these prices. This process would follow strict procedures in compliance with best practices and in accordance with regulatory guidance.
4. Prices based on privacy preserving computations on user-input prices using cryptographic techniques ("Cryptographic Derived Price").

Commitment to Trade

The method and secure peer-to-peer network in accordance with the invention provides several modes of usage with various levels of pre-trade and intermediate-trade commitment:

1. Pre-Trade Commitment. Users commit to trade any transaction that meets their trade parameters. For example a buyer may commit to buying at the Third Party Price, "100 XYZ bonds maturing between 5 to 7 years." Moreover such an order may be good for 5 days.
2. Intermediate-Trade Commitment. Pre-Pricing. Users are presented with a proposed trade with all details being known, except a yet-to-be-determined price. In general, users would commit to a trade and then the trade would be priced after 3 PM or 4 PM. An acceptance is subject to acceptance by matching counterparty (or counterparties). Users can still have a rule that says: "commit if price is within a certain price range".

3. Intermediate-Trade Commitment. Post-pricing. User are presented with a proposed trade with all details known, including price. The order matching algorithm runs at specific times of the day, such as 10 am, 11 am, 12 pm, 1 pm, 2 pm, 3 pm, 4 pm, and presents users with specific trades with specific prices. Users have a time limit, such as 15 minutes, to accept the trade. All agreed trades are re-optimized to maximize trade volume. Some trades may not be completed, despite commitment from one side of the transaction because no potential counterparty entered into a final agreement.

4. Firm Trades Only—user would get trade proposal only AFTER the counterparty has already accepted the trade.

Execution Price Transparent Improvement

If a match is found and the two sides use different pricing options, then in accordance with preferred embodiments the invention seeks to improve pricing for both sides equally. For example, if a seller seeks to sell at 101 or better, and a buyer seeks to buy at the Third party price, which turns out to be 103, the trade is executed at an average of 101 and 103 (ignoring and costs/fees/commissions).

Compliance Module

The Invention includes a module for compliance supervisors to review all trades and compare with market data, such as publically available transaction data (such as MSRB or TRACE data).

Security Built in and Exposing Confidential Information

Encryption of data is ubiquitous throughout the secure peer-to-peer platform in accordance with the invention under the assumption that the order matching algorithm is itself a semi-trusted third party to market participants, and that market participants are semi-trusted to each other. Data encryption serves several purposes. One purpose is the widely known use of encryption for security purposes on cellphones or other mobile devices, where biometric security features would depend on the actual device in use. Next, recognizing that certain trading strategies are confidential, the invention includes partial use of homomorphic encryption to preserve user's confidential information, such as a proprietary trade strategy. The order matching processes would have only partial knowledge of user information. Certain parts of the trading algorithm computations may be performed via cloud computing with semi-trusted parties. Moreover, under certain peer-to-peer communication modes, peers may broadcast encrypted messages to each other to determine if buyer/sellers have matching needs. Users control how much anonymity they wish to preserve.

Figure 4:
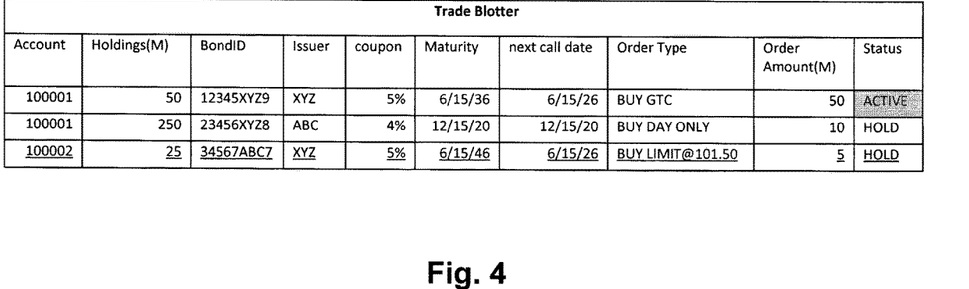
FIG. 4 shows an exemplary display of a "Trade Blotter" in accordance with the invention.

FIG. 4 shows an exemplary display of a "Trade Blotter" in accordance with the invention. With specific reference to FIG. 4, shown therein is a trade blotter, and a summary of the status of transactions. The Trade Blotter indicates a summary of trading activity at a specific a point in time, where the precise "look and feel" depends on the device, such as a desktop or mobile phone, upon which the Trade Blotter is displayed. It should be understood "Trade Blotter" is a term-of-art that is well known to practitioners in the field of bond trading. The method and secure peer-to-peer network in accordance with the invention includes the ability to cancel or put trades on hold.

Figure 5:
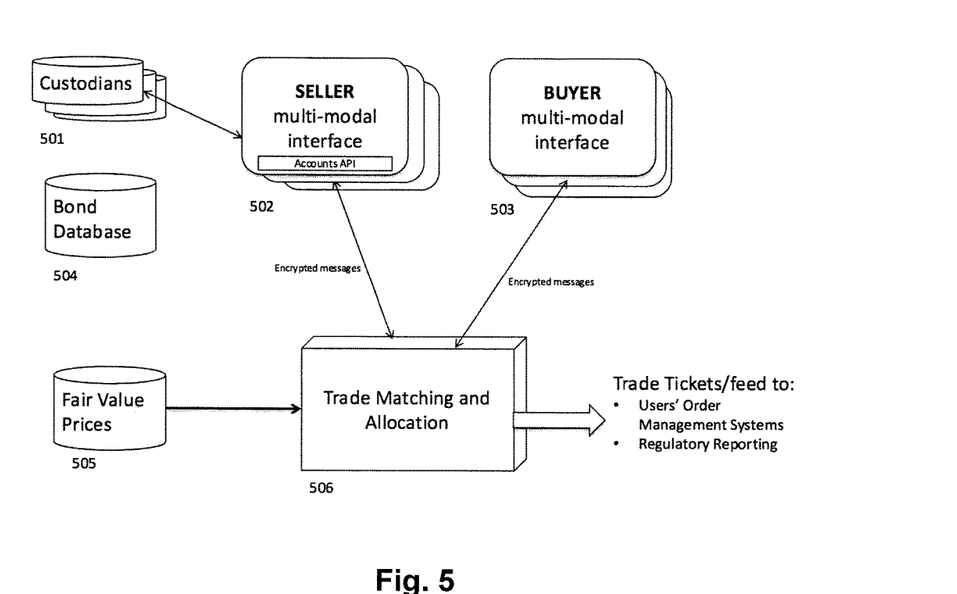
FIG. 5 is a top level schematic block diagram, without an encryption layer, illustrating an overall view of the invention via which connectivity to third-party applications is provided to assist users to select desired bonds for purchase or sale.

FIG. 5 is a top level schematic block diagram, without an encryption layer, illustrating an overall view of the invention via which connectivity to third-party applications is provided to assist users to select desired bonds for purchase or sale. SELLER multi-modal interface 502 is the main user interface for bond sellers. SELLER 502 multi-modal interface may be implemented in a desktop computer, iPad, smart phone or other similar devices. SELLER multi-modal interface 502 and BUYER multi-modal interface 503 permit voice and text input. The "Account API" within SELLER multi-modal interface 502 provides connectivity to other accounting or portfolio maintenance systems, and to Custodians 501, comprising third-party organizations that perform functions such as fiduciary roles in safekeeping assets. This connectivity is used, in part of, for error checking to insure that SELLER multi-modal interface 502 sells only bonds that it owns. Many instantiations of SELLER multi-modal interface 502 exist for multiple users of the Invention. BUYER multi-modal interface 503 is the main interface for bond buyers.

Figure 6:
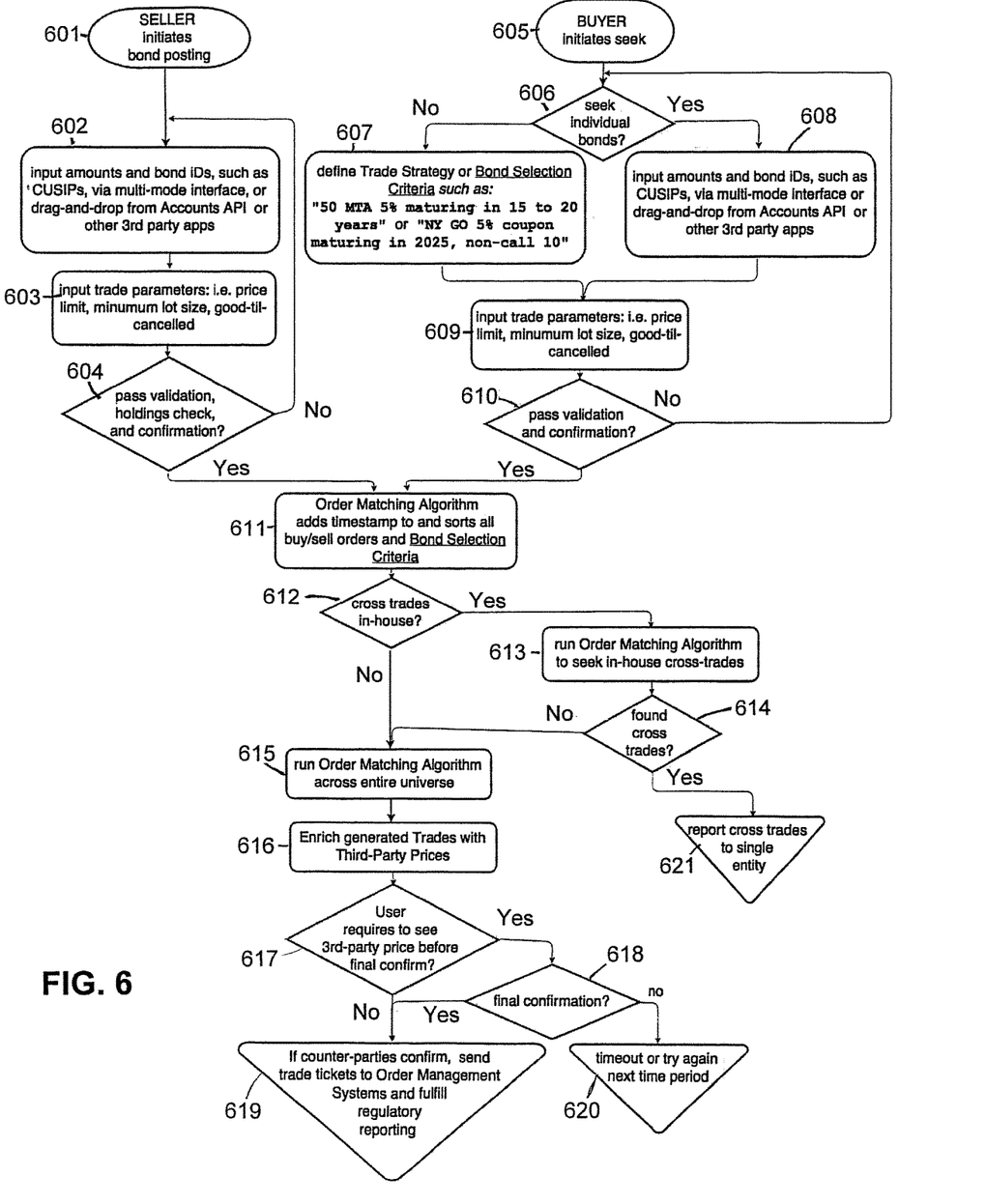
FIG. 6 is a flowchart of the buyer/seller process in accordance with the method of the invention.
Figure 7:
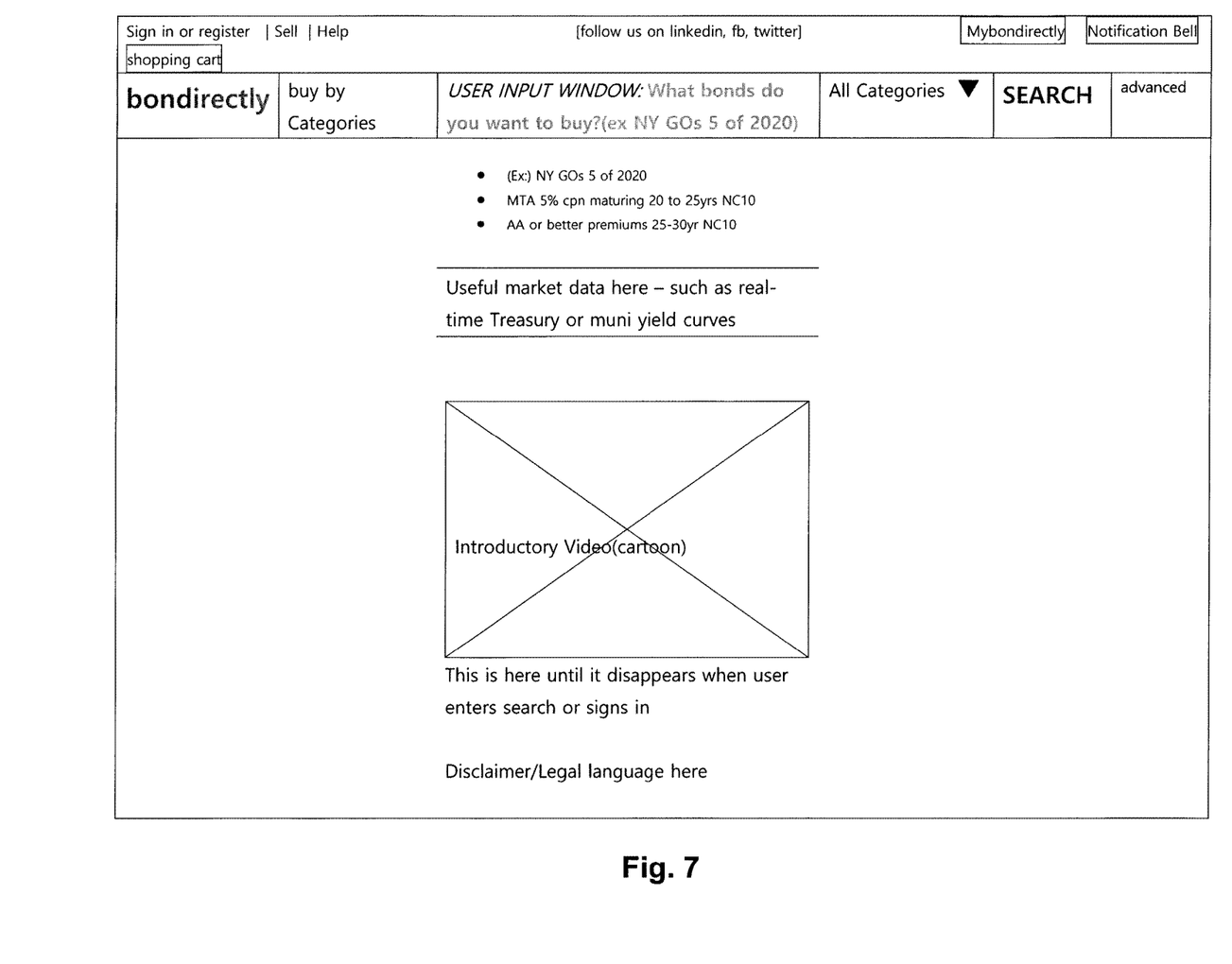
FIG. 7 is an exemplary illustration of a startup user interface with the user input window in accordance with the invention.
Figure 8:
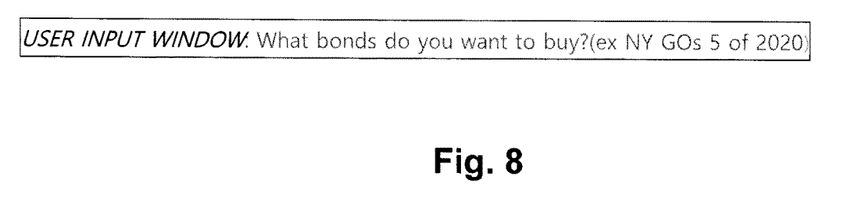
FIG. 8 is an exemplary illustration of a user input window interface window in accordance with the invention.

FIG. 6 is a flowchart of the buy/sell process in accordance with the method of the invention. The method comprises entering enters Bond Selection Criteria by a user (seller) to describe bonds for sale to initiate the posting of a bond, as indicated in step 601. An exemplary interface for performing the method in accordance with the invention is shown in FIG. 7 or FIG. 8. Next, the amount and bond IDs, such as CUSIPs are input, via the exemplary interface or by conventional "drag-and-drop" techniques, from account application programming interfaces (API's) or other $3^{rd}$ party applications, as indicated in step 602. Here, it should be noted the connectivity to other applications using "Accounts API" are as described with respect to FIG. 5, and that steps 601 and 602 are implemented by Client 101 shown in FIG. 1.

Next, the user enters trade parameters, such as the minimum price at which user (seller) is willing to sell, as indicated in step 603. Here, terms such as "good-'til-cancelled", meaning to keep an order open until the user takes action to cancel the order, follow terms-of-art known in the financial services industry. These terms are used typically in equity markets, but the disclosed embodiments of the invention borrow their meanings for use in the bond market. Continuing on the seller side, a check is now performed to determine whether a validation, a holding check and confirmation are passed, as indicated in step 604. Here, the holding check contains validation software that assures the user is selling bonds that are owned or shall be owned and available for delivery as of the applicable settlement date. If validations fail in step 604, users are prompted to correct their input, and a return to step 602 occurs.

Step 605 is the start of the BUYER process. Here, an exemplary interface for performing the method in accordance with the invention is shown in FIG. 7 or FIG. 8. A check is performed to determine whether the buyer wishes to purchase individual bonds, as indicated in step 606. This decision directs process flow to steps 607 or 608, depending on whether user is seeking to buy very specific bonds or is entering Bond Selection Criteria for the types of bond user wishes to buy.

On the one hand, if the user does not seek individual bonds, then the user is prompted to define a trade strategy or bond selection criteria, as indicated in step 607. This may be accomplished via voice or plain text input of bonds to buy such as "50 M.T.A. 5% maturing in 15 to 20 years", "NY General Obligation 5% coupon maturing in 2025, non-call 10".

On the other hand, if buyer wishes to purchase individual bonds, then the user (buyer) inputs the amount and bond IDs, such as CUSIPs, via the exemplary interface or by conventional "drag-and-drop" techniques, from account API's or other 3 party applications, as indicated in step 608. Here, it should be noted the connectivity to other applications using "Accounts API" are as described with respect to FIG. 5. This helps the user to analyze portfolios and deduce what kind of bonds to buy; an example would be an analytical tool to rebalance a portfolio, which would produce a "buy list" of bonds to purchase.

Step 609 has similar functionality step 603, which is to accept and check for well-formed trade parameters. Thus, a user (buyer) enters trade parameters, such as the maximum price at which the buyer is willing to buy the bonds, as indicated in step 609. Here, terms such as "good-'til-cancelled", meaning to keep an order open until user takes action to cancel the order, follow terms-of-art known in the financial services industry. These terms are used typically in equity markets, but the disclosed embodiments of the invention borrow their meanings for use in the bond market. Continuing on the buyer side, a check is now performed to determine whether a validation and confirmation are passed, as indicated in step 610. If validation fails in step 610, the user (buyer) is prompted to correct their input, and a return to step 606 occurs.

With trade order details gathered from both the SELLER and BUYER, timestamps are added to all inputs and orders are sorted to prioritize trade fulfillments, as indicated in step 611. Here, the method is implemented in a fair and transparent way and in accordance with best practices as advised by industry participants and regulators.

A check is now performed to determine whether cross trades should be routed "in-house", as indicated in step 612. Here, the method in accordance with the invention provides special functionality to route cross trades "in-house" at large asset management firms if possible and in accordance with internal policies and SEC Rule 17a-7 under the 1940 Investment Company Act of 1940. This is an option for certain users to implement if they so desire. All trades would have a preference to be executed in-house. On the one hand if cross trades should be routed "in-house", then an order matching algorithm is implemented to seek "in-house" cross-trades, as indicated in step 613. Here, "Order Matching" is implemented strictly inside a single investment company.

A check is now performed to determine whether cross trades are located, as indicated in step 614. That is, two mutual funds in the same organization can trade with each other if cross trades are found. If such trades are found, then reporting is performed, as indicated in step 621 in accordance with company policies. More often than not, cross trades are generally unfound. Consequently, orders are routed back from step 614 to step 615. At this point, an order matching algorithm is executed across the entire universe of available bonds from all other potential counterparties, as indicated in step 615.

The functionality of 615 and 613 is described in "Optimization" and other sections; whereas the methodologies, which use encryption is described with respect to FIGS. 1, 2 and 3. In one mode of operation, trades are matched without prices, as prices are to be determined later. Next, generated matched trades are enriched with "Third Party" prices, as indicated in step 616. That is, Third-Party or Derived Prices are added to trades matched in step 615. Next, a check is performed to determine whether the user requires to see or know the third party price prior to providing a final confirmation, as indicated in step 617. Here, the functionality implemented via step 617 depends on initial trade parameters of the users. The methodology here follows the manner in which US mutual funds, subject to the Investment Company Act of 1940, operate: A mutual fund buyer commits to buying mutual fund shares during market hours (e.g., 9:30 pm to 3:59 pm) using underlying security prices to be determined at 4:00 PM by an independent third party. These prices are "rolled-up" to compute the net asset value of a fund. In a similar way, the method and peer-to-peer network provide users with the option that allow them to preemptively accept trade matches, subject to Bond Selection Criteria, using prices to be determined at a subsequent point in time —typically at the 4:00 PM price evaluation provided by a trusted third party—here called Third Party Prices or prices may be Derived Prices, based on a calculation using an agreed upon formula and market data.

A check is now performed to determine whether the user requires to see the final price before final confirmation, as indicated in step 618. If the user does not require to see the final price before final confirmation, then trade tickets are sent to relevant order management systems and regulatory reporting is fulfilled, as indicated in step 619. That is, if all parties agree to the trade, final tickets and reporting occurs. On the other hand, if the user requires to see the final price before final confirmation (in 617 and 618) but fails to respond to a final confirmation, then the trade expires, as indicated in step 620.

FIG. 7 is an exemplary illustration of a startup user interface with the user input window in accordance with the invention. That is, FIG. 7 shows one possible webpage for a segment of the BUYER multi-modal interface 503 user interface shown in FIG. 5. With simultaneous reference to FIGS. 5 and 7, multiple instantiations of BUYER multi-modal interface 503 exist, i.e., one for each buyer. BUYER multi-modal interface 503 also has connectivity to other systems (not shown) to help the user select bonds it wishes to buy. The method and secure peer-to-peer network uses artificial intelligence tools to help the SELLER multi-modal interface 502 and BUYER multi-modal interface 503 define the bonds they wish to buy or sell. In accordance with disclosed embodiment of the invention, these processes replace the need for participants to chat with many salespeople about what they are looking for, or to sort through many lists of bonds on various electronic systems. Instead, among other interface modes, participants may use speech or text to communicate what they want to TRADE MATCHING AND ALLOCATION ENGINE 506. In accordance with the invention, all communications among SELLER multi-modal interface 502, BUYER multi-modal interface 503 and TRADE MATCHING AND ALLOCATION ENGINE 506 is encrypted. The SELLER multi-modal interface 502 and BUYER multi-modal interface 503 can comprise different functions of a single user application. TRADE MATCHING AND ALLOCATION ENGINE 506 locates and presents to the SELLER multi-modal interface 502 and BUYER multi-modal interface 503 matching trades using partial zero-proof knowledge of the buy or sell criteria of the SELLER multi-modal interface 502 and BUYER multi-modal interface 503.

FIG. 7 is an exemplary illustration of a startup user interface with the user input window in accordance with the invention. Of particular note here is the window in the top center labeled: "USER INPUT WINDOW: What bonds do you want to buy?(ex NY GOs 5 of 2020)". In this "USER INPUT WINDOW", the text "What bonds do you want to buy?(ex NY GOs 5 of 2020)" represents one example for showing users where and how to enter text in plain natural language text (English in this case). In accordance with the invention, users may use voice command or text to enter what functions they wish to perform. Furthermore, the interface may have a look-and-feel of e-commerce websites used for shopping consumer goods, such as ebay.com or amazon.com. One difference in this case is the user is shopping for bonds.

FIG. 8 is an exemplary illustration of a user input window interface window in accordance with the invention. That is, FIG. 8 shows a standalone "USER INPUT WINDOW", which is initially shown in FIG. 7. This window has full functionality as well as natural language capabilities that serves as an artificially intelligent bond salesperson. Depending on the hardware configuration, user name use voice commands, text and/or haptic technology. It should be noted, however, the implementation of voice commands, text and/or haptic technology is beyond the scope of the instant invention. Thus, as opposed to how these functions are implemented, the fact that they are implemented is the salient aspect to glean, here.

Figure 9:
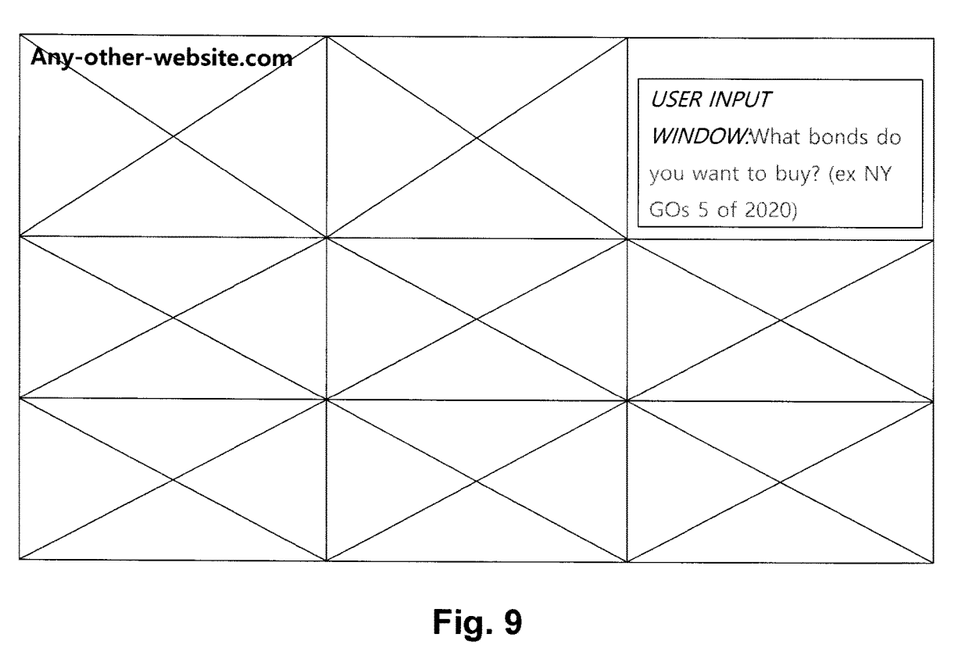
FIG. 9 is an illustration of an exemplary user input window embedded in a third-party web application in accordance with the invention.

FIG. 9 is an exemplary illustration of a user input window interface window in accordance with the invention. That is, FIG. 9 shows the "USER INPUT WINDOW" of FIG. 8 embedded inside a third-party website. This is a "store-within-a-store" and has connectivity with the third party websites in which the "USER INPUT WINDOW" is embedded. The functionality and connectivity depends on the third party application. Examples are: i) A third-party custodian application may embed the "USER INPUT WINDOW" and share bond holdings with the peer-to-peer network in accordance with disclosed embodiments of the invention, ii) a third-party bond issuer (such as a municipality or Fortune 500 company) may embed the "USER INPUT WINDOW" in its website, but subject to limiting trading to its own bonds, iii) a bond analyst or market strategist may embed the "USER INPUT WINDOW" in a research reporting website that recommends a buy or sell of a particular bond, iv) journalists or media websites may embed the "USER INPUT WINDOW" in reporting or press releases that grant instant trade capability to users that would wish to act upon news about a bond.

Thus, while there have shown, described and pointed out fundamental novel features of the invention as applied to a preferred embodiment thereof, it will be understood that various omissions and substitutions and changes in the form and details of the method and system illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for executing trades at mid-market prices via a distributed computer system comprising a homomorphic cryptographically secure electronic peer-to-peer bond-trading network which preserves privacy and secrecy of bond order data from third parties, the method comprising:
  initiating a bond selling process via at least one first client of the distributed computer system, said bond selling process being homomorphically encrypted via a first partial homomorphic encryption engine located within the at least one first client;
  initiating a bond buying process via at least one second client of the distributed computer system comprising the homomorphic cryptographically secure electronic peer-to-peer bond-trading network which preserves privacy and secrecy of the bond order data from third parties, said bond buying process being homomorphically encrypted via a second partial homomorphic encryption engine located within the at least one second client;
  encrypting time stamps homomorphically and adding the homomorphically encrypted time stamps in a server having a processor and memory to all inputs and sort orders obtained from the homomorphically encrypted bond selling and buying processes to prioritize trade fulfillments based on trade order details gathered during the homomorphically encrypted bond selling and buying processes;
  performing a check to determine whether trades should be routed internally by performing a zero knowledge (ZK) proof upon encrypted orders;
  performing a check to determine whether to route the trades internally across different groups within specific entities before trading among different entities by performing a zero knowledge (ZK) proof of order data;
  executing an order matching algorithm across an entire universe of available bonds from all other potential counterparties when trades are not routed internally, said homomorphically encrypted bond selling and buying processes remaining encrypted during execution of said matching algorithm, otherwise a report being generated when trades are routed internally;
  enriching generated matched trades with third party prices;
  performing a check to determine whether the buyer or seller requires seeing a final price before final confirmation; and
  sending trade tickets to order management systems and performing regulatory reporting based upon the buyer and/or seller confirming the final price before final confirmation when required by the check, otherwise allowing a trade to expire when the buyer or seller requires seeing the final price before final confirmation and fails to respond to the final confirmation.

2. The method of claim 1, wherein the bond selling process comprises:
  entering bond selection criteria to describe bonds for sale to initiate posting of a bond to the distributed computer system;
  inputting an amount and IDs of the bonds for sale and obtained from account application programming interfaces or other third-party applications to the distributed computer system;
  entering trade parameters into the distributed computer system; and
  performing a check to determine whether a validation, a holding check and confirmation are passed.

3. The method of claim 1, wherein the bond buying process comprises:
  determining whether individual bonds are desired for purchase;
  inputting an amount and IDs of bonds desired for purchase to the distributed computer system when individual bonds are desired for purchase, otherwise issuing a prompt to define a trade strategy or bond selection criteria when individual bond are not desired for purchase;

entering trade parameters at which bonds will be bought; and performing a check to determine whether a validation and confirmation are passed.

4. The method of claim 1, wherein the at least one first and second clients each further include: each implement voice recognition via a voice recognition server, and queries via a natural language to database query engine.

5. The method of claim 4, wherein the natural language to database query engine converts natural language text to computer-readable database query language commands.

6. The method of claim 1, wherein the first and second partial homomorphic encryption engines perform at least a portion cryptographic algorithms.

7. The method of claim 1, wherein a cryptographic network server communicates with the at least one first and second clients.

8. The method of claim 7, wherein the cryptographic network server forms at least part of a secure peer-to-peer network of servers.

9. The method of claim 8, wherein the secure peer-to-peer network of servers implement cryptographic algorithms comprising privacy preserving set operations.

10. The method of claim 1, wherein the server further derives prices via a zero knowledge (ZK) derived prices engine, allocates and matches trades via a trade matcher and allocator, processes and analyses bonds via a bond database server having a processor and memory and a bond analytics server having a processor and memory.

11. The method of claim 10, wherein the trade matcher and allocator collects all results emanating from a respective bond selection criteria and Cryptographic Network Server of each user, and performs matching based at least on partial knowledge;

wherein the bond database server maintains terms and conditions about specific bonds; and wherein the bond analytics server performs computations comprising yields and durations of specific bonds.

12. A method for executing trades at mid-market prices via a distributed computer system comprising a homomorphic cryptographically secure electronic peer-to-peer bond-trading network which preserves privacy and secrecy of bond order data from third parties, the method comprising:

initiating a bond selling process via at least one first client of the distributed computer system, said bond selling process being homomorphically encrypted via a first partial homomorphic encryption engine located within the at least one first client;

initiating a bond buying process via at least one second client of the distributed computer system comprising the homomorphic cryptographically secure electronic peer-to-peer bond-trading network which preserves privacy and secrecy of the bond order data from third parties, said bond buying process being homomorphically encrypted via a second partial homomorphic encryption engine located within the at least one second client;

encrypting time stamps homomorphically and adding the homomorphically encrypted time stamps in a server to all inputs and sort orders obtained from the homomorphically encrypted bond selling and buying processes to prioritize trade fulfillments based on trade order details gathered during the homomorphically encrypted bond selling and buying processes;

performing a check to determine whether trades should be routed internally by performing a zero knowledge (ZK) proof upon encrypted orders;

performing a check to determine whether to route the trades internally across different groups within specific entities before trading among different entities by performing zero knowledge (ZK) proof of order data; and generating a report when the trades are routed internally.

* * * * *